Sept. 1, 1959     L. W. FOLLETT ET AL     2,902,263
ROTARY INDIRECT COOLER
Filed Dec. 23, 1957
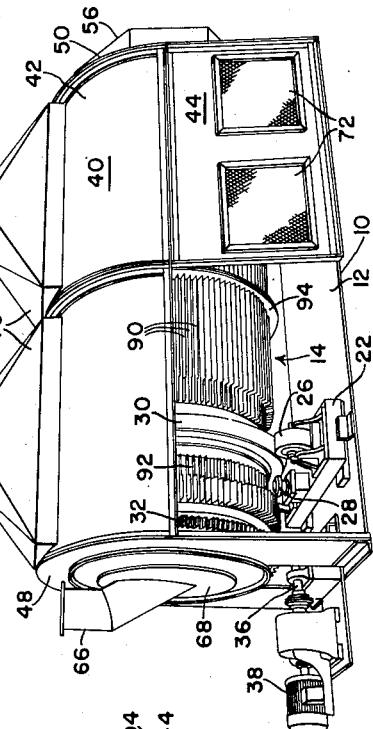
FIG. 1
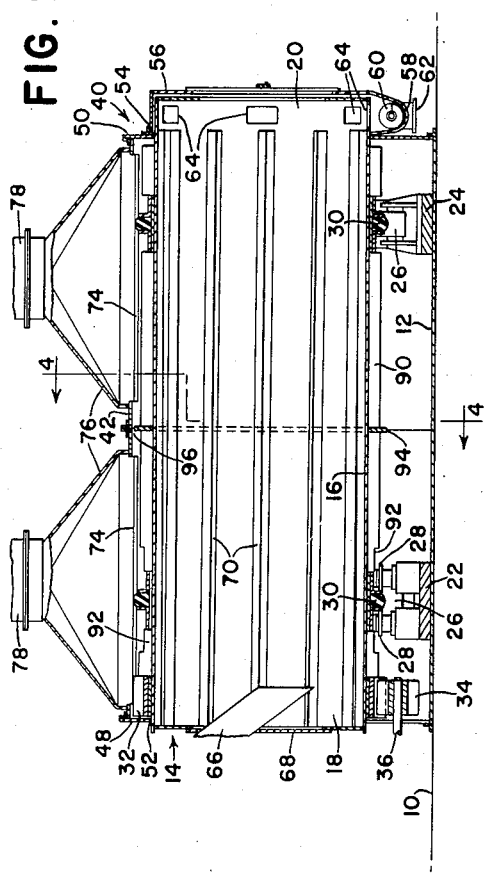
FIG. 2
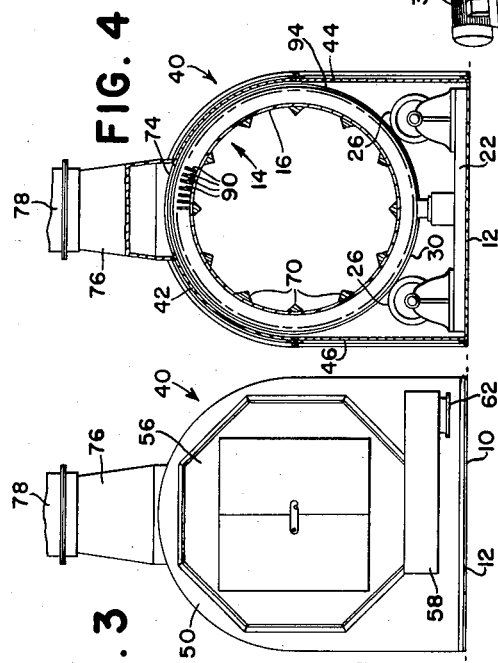
FIG. 4
FIG. 3
INVENTORS
L. W. FOLLETT
C. HAGEN
BY
ATTORNEY

United States Patent Office 2,902,263
Patented Sept. 1, 1959

2,902,263

ROTARY INDIRECT COOLER

Louis W. Follett and Carl Hagen, Moline, Ill., assignors to Davenport Machine and Foundry Co., Davenport, Iowa Application December 23, 1957, Serial No. 704,622

8 Claims. (Cl. 257—88)

This invention relates to the art of materials handling and more particularly to apparatus for effecting heat exchange between the material being handled and a medium having a temperature different from that material. Specifically, the apparatus comprises a rotary drum through which material is passed, plus means for effecting heat exchange with the exterior surface of the drum whereby to effect a temperature change in the material within the drum which is in heat-exchange relation to the drum.

The invention finds particular, but by no means exclusive, utility in the handling of pulverulent or granular material such as lime etc., which is processed at a relatively high temperature and must be rapidly cooled to facilitate further handling. For example, it may be required that a temperature drop be effected from 1200° F. to 200° F. and this must be accomplished in a simple and expeditious manner so as to avoid undue expense, loss of time and occupational hazards caused by permitting the hot lime to become entrained in the ambient and cooling air. According to the present invention, these significant features are achieved by the provision of a rotary drum operating in an air chamber through which cooling air is circulated, material in the drum losing its heat to the drum and the drum in turn losing its heat to the circulated air. It is a feature of the invention that the interior of the drum is substantially sealed off from the air chamber so that there is no direct transfer between the air and the material, whereby the material is not entrained by the air. It is a still further object of the invention to provide the drum with external heat-exchange means such as fins whereby the external heat-exchange area of the drum exposed to the air chamber is multiplied many times. Further objects reside in improved and economical design and construction; means for introducing material into one end of the drum and for discharging material from the other end; means for causing the material to move axially of the drum during rotation thereof; means for dividing the air stream through the chamber into separate paths; means for preventing cross-over or "short-circuiting" between these paths; and such other features and objects, inherent in and encompased by the invention, as will become apparent from the following description of a preferred embodiment thereof as illustrated in the accompanying sheet of drawings, the several figures of which are described below:

Figure 1 is a general perspective of the apparatus, with one side panel removed to expose a portion of the interior structure.

Figure 2 is a longitudinal section through the apparatus.

Figure 3 is an end elevation as seen from the right hand end of Figures 1 and 2.

Figure 4 is a section on the line 4—4 of Figure 2.

The apparatus selected for purposes of illustration is disposed in a horizontal position, which has been demonstrated by experience to be most practicable. Hence, description thereof will proceed on the basis of the apparatus as having top, bottom, etc. components. However, it will be appreciated that the apparatus may be otherwise arranged while exploiting the features of the invention; therefore, such geographical expressions are to be taken as illustrative and not limiting. Likewise, the several exemplary figures furnished as to dimensions, temperature, etc. are representative and are intended to instruct those versed in the art in the adaptation and use of the invention.

The apparatus may rest on or be supported by base means, here represented by the floor, as at 10, which may have superimposed thereon a base plate 12 if desired. An axially elongated drum 14 is disposed above this base means for rotation on a horizontal axis, and this drum has a cylindrical imperforate wall 16 and opposite ends 18 and 20. Supporting of the drum for rotation as aforesaid is achieved by a pair of axially spaced apart supports 22 and 24 which are identical, each comprising a pair of supporting rollers 26 and axial thrust rollers 28 (only one of each being shown) which carry the drum by means of axially spaced apart coaxial rings or tires 30, preferably of cast or forged steel. One end of the drum carries a peripheral gear 32 which is driven by a pinion 34 keyed to a shaft 36 that is powered by an electric motor 38, for example. In the structure shown, the drum may have a diameter of five feet, an axial length of fifteen feet, and be rotated at a speed of nine r.p.m.; although, as indicated, these factors may be varied according to material, size of the installation, etc.

A housing, indicated in its entirety at 40, contains the drum 14, and is of inverted U-shape, having a top or upper semicylindrical wall 42 and opposite tangential side walls 44 and 46 depending to the base means. The semicylindrical wall 42 is of course concentric with the drum, and the housing further has opposite end walls 48 and 50 respectively adjacent to the drum ends 18 and 20. The wall 48 has a circular opening 52 therein through which the drum end 18 projects outwardly in a close running fit to afford a substantial air seal. The opposite end wall 50 is likewise circularly apertured at 54 to accommodate the opposite end 20 of the drum in a manner quite similar to that described for the other end, except that this end 50 includes a box-like structure 56 which depends to a lower auger trough 58 in which an auger 60 operates to convey material to an outlet 62. Communication between the interior of the drum and the auger trough 58 is afforded by openings 64 in the cylindrical drum wall 16 adjacent to the drum end 20, this arrangement providing discharge means for material exiting from the drum. Material inlet means is established at the drum end 18 by an inlet spout 66 entering generally axially in the drum and having a sealing plate 68 fixed to the housing or even to the floor by any suitable means not important here.

The interior of the cylindrical wall 16 of the drum carries circumferentially spaced bars or angles 70 which have a slight pitch or spiral and thus operate as means for causing material, introduced into the drum via 66, to flow axially of the drum for discharge at 58—60—62 as the drum rotates. It will be understood of course that the inlet 66 is appropriately connected to suitable conveying means (not shown) and that the outlet at 62 is likewise connected to a conveyor or tube (not shown) to be conducted away from the apparatus. These may be of any conventional construction and are not material to the present disclosure.

The housing and its component walls afford an air chamber enclosing the drum and substantially sealed from the interior of drum by the end structure previously described, and, according to the broad principle of the invention, air is circulated through this chamber as a heat-exchange medium having heat-exchange relation with the material handling drum 14. In this instance, the air is at a lower temperature than the material and thus affords cooling of the material. For this purpose, the housing has air inlets, here screened panel portions 72 of at least the side wall 44, it being understood that one of the panel portions has been omitted in Figure 1 in the interests of clarity. These inlets are lower than the axis of rotation of the drum and thus are adjacent to the floor for picking up ambient air. In addition, the semi-cylindrical top wall 42 of the housing has a pair of air outlets 74, each of which carries an external hood 76 and these hoods are connected to branches 78 of a bifurcated air conduit 80 which includes a supporting housing 82 in which is mounted means for creating the circulation of air through the chamber via entry at 72 and exit via 74—76—78—80—82 at a conduit top extension 84 which has a typical deflector 86 thereon. This air flow means may comprise an appropriate fan, generally shown at 88, in the conduit housing 82. Again by way of example only, experience has shown that typical requirements will be satisfied, for example, by a suitable axial flow fan such as the well-known De Bothezat "Bifurcator."

From the description thus far it will be seen that by a continuous process, material is introduced at 66 into the interior of the drum 14 and is caused by the angles or bars 70 to move to the other end of the drum as the drum is rotated by the drive means 38—36—34—32, at which end the material exits at the means 64—60 etc. During its travel axially of the drum, the material is of course in contact with the interior surface of the drum cylindrical wall 16 and is therefore in heat-exchange relation with said wall. The bars 70 also cause the material to "tumble" as it flows axially, thus improving the heat exchange. Air flowing through the air chamber and over the drum cools the drum, or abstracts heat therefrom. In the example shown, the installation handles material at the rate of five thousand pounds per hour and the axial flow fan draws on the order of eighteen thousand cubic feet of air per minute. During operation, there is no direct exchange between the material and the air and thus dust, etc. are avoided.

The heat-exchange characteristics of the apparatus are improved by the provision on the drum of a plurality of external, circumferentially spaced heat-exchange fins 90 running lengthwise of the external surface of the cylindrical wall 16 of the drum. These fins are cut away slightly at 92 to accommodate the components 26 and 28, but for all practical purposes the fins are coextensive with the drum. However, in a preferred embodiment, as shown, the fins are interrupted by an annular partition ring 94 disposed substantially midway of the ends of the drum and rigidly secured to the drum. This ring has an outside diameter somewhat larger than that of the imaginary cylinder containing the fins 90 and thus has a close running fit with the interior of the housing semi-cylindrical top wall 42, as best shown at 96. The arrangement of this ring disposes it axially between the air outlets 74, separating the air into two streams or paths as it flows out these outlets into the main conduit 80. Thus the ring prevents cross-over or "short-circuiting" between opposite ends of the housing and therefore improves the efficiency of the operation.

In the particular example shown, on a drum having a five-foot diameter cylindrical wall 16, the fins add four inches to the radius of this wall and are metallic and on the order of one-eighth inch thick. In number, they total one-hundred and nine and increase the heat-exchange area of the drum by approximately twenty times. The nine r.p.m. of the drum produces a peripheral speed of one-hundred forty-four feet per minute at the periphery of the drum. These are given by way of example only, but they do show the efficiency of the apparatus for the purposes intended.

The foregoing features are deemed to be clear from the preceding description, and features and objects not categorically enumerated will readily occur to those versed in the art, as will many modifications and alterations of the preferred embodiment disclosed, all of which may be achieved without departure from the spirit and scope of the invention.

What is claimed is:

1. Apparatus of the class described, comprising: base means; an axially elongated material-handling drum arranged above the base means for rotation about a horizontal axis and having an imperforate cylindrical wall and opposite ends; an external partition ring encircling the drum substantially midway between its ends; a plurality of circumferentially spaced externally radial heat-exchange fins running lengthwise of the cylindrical wall from the partition ring to the drum ends; a housing of inverted U-shape embracing the drum from above and having a semicylindrical top wall concentric with the drum and opposite side walls depending to the base means, said housing further having opposite upright end walls respectively adjacent to the drum ends, said semicylindrical wall having a close running clearance with the partition ring and said housing affording an air chamber about the drum and substantially sealed off from the interior of the drum, one of said side walls having air inlets therein below the drum axis and axially at each side of the partition ring and said semicylindrical wall having air outlets therein axially at each side of the partition ring; a bifurcated air conduit having branches connected respectively to the air outlets in the top wall; air-flow-generating means in the conduit for drawing air through the inlets, into the aforesaid air chamber and in heat-exchange relation to the drum fins as the drum rotates and out through the branches; means at one end of the drum for introducing material into the interior of the drum; means in the drum for causing such material to move axially through the drum and in heat-exchange relation to the cylindrical wall as the drum rotates; and means at the other end of the drum for discharging the material.

2. The invention defined in claim 1, in which: said means at said one end of the drum comprises an end closure secured to said end of the drum and having a material inlet therethrough; and said means at the other end of the drum comprises an end plate on the drum and material-discharge openings in the cylindrical wall of the drum and means external to the air chamber for receiving material discharged by said material-discharge openings.

3. The invention defined in claim 1, in which: said means at the other end of the drum comprises an end plate on the drum and material-discharge openings in the cylindrical wall of the drum and means external to the air chamber for receiving material discharged by said material-discharge openings.

4. Apparatus of the class described, comprising: base means; an axially elongated material-handling drum arranged above the base means for rotation about a horizontal axis and having an imperforate cylindrical wall and opposite ends; an external partition ring encircling the drum substantially midway between its ends; a plurality of circumferentially spaced externally radial heat-exchange fins running lengthwise of the cylindrical wall from the partition ring to the drum ends; a housing of inverted U-shape embracing the drum from above and having a semicylindrical top wall concentric with the drum and opposite side walls depending to the base means, said housing further having opposite upright end walls respectively adjacent to the drum ends, said semicylindrical wall having a close running clearance with the partition ring and said housing affording an air chamber about the drum and substantially sealed off from the interior of the drum, one of said side walls having air inlets therein below the drum axis and axially at each side of the partition ring and said semicylindrical wall having air outlets therein axially at each side of the partition ring; means for causing air to flow through the inlets, into the aforesaid air chamber and in heat-exchange relation to the drum fins as the drum rotates and out through the outlets in two streams divided by the partition ring; means a one end of the drum for introducing material into the interior of the drum; means in the drum for causing such material to move axially through the drum and in heat-exchange relation to the cylindrical wall as the drum rotates; and means at the other end of the drum for discharging the material.

5. Apparatus of the class described, comprising: an axially elongated rotatable material-handling drum having an imperforate cylindrical wall and opposite ends; an external partition ring encircling the drum substantially midway between its ends; a plurality of circumferentially spaced externally radial heat-exchange fins running lengthwise of the cylindrical wall from the partition ring to the drum ends; a housing of U-shape embracing the drum and having a semicylindrical wall concentric with the drum and opposite side walls tangential to said semicylindrical wall, said housing further having opposite radial end walls respectively adjacent to the drum ends, said semicylindrical wall having a close running clearance with the partition ring and said housing affording an air chamber about the drum and substantially sealed off from the interior of the drum, one of said side walls having air inlets therein axially at each side of the partition ring and said semicylindrical wall having air outlets therein axially at each side of the partition ring; a bifurcated air conduit having branches connected respectively to the air outlets in the top wall; air-flow-generating means connected to the conduit for drawing air through the inlets, into the aforesaid air chamber and in heat-exchange relation to the drum fins as the drum rotates and out through the branches; means at one end of the drum for introducing material into the interior of the drum; and means in the drum for causing such material to move axially through the drum and in heat-exchange relation to the cylindrical wall as the drum rotates.

6. Apparatus of the class described, comprising: an axially elongated rotatable material-handling drum having an imperforate cylindrical wall and opposite ends; an external partition ring encircling the drum substantially midway between its ends; a plurality of circumferentially spaced externally radial heat-exchange fins running lengthwise of the cylindrical wall from the partition ring to the drum ends; a housing of U-shape embracing the drum and having a semicylindrical wall concentric with the drum and opposite side walls tangential to said semicylindrical wall, said housing further having opposite radial end walls respectively adjacent to the drum ends, said semicylindrical wall having a close running clearance with the partition ring and said housing affording an air chamber about the drum and substantially sealed off from the interior of the drum, one of said side walls having air inlets therein axially at each side of the partition ring and said semicylindrical wall having air outlets therein axially at each side of the partition ring; means for causing air to flow through the inlets, into the aforesaid air chamber and in heat-exchange relation to the drum fins as the drum rotates and out through the outlets in two streams divided by the partition ring; means at one end of the drum for introducing material into the interior of the drum; and means in the drum for causing such material to move axially through the drum and in heat-exchange relation to the cylindrical wall as the drum rotates.

7. Apparatus of the class described, comprising: base means; an axially elongated material-handling drum arranged over the base means for rotation about a horizontal axis and having an imperforate cylindrical wall and opposite ends; an external partition ring encircling the drum substantially midway between its ends; a plurality of circumferentially spaced radial heat-exchange fins running lengthwise of the cylindrical wall from said ring to said ends; a housing of inverted U shape embracing the drum from above and having a semicylindrical top wall concentric with the drum and opposite side walls depending to the base means, said housing further having opposite upright end walls respectively adjacent to the drum ends, said semicylindrical wall having a close running clearance with the partition ring and said housing affording an air chamber about said drum and substantially sealed off from the interior of the drum, said housing having air inlets therein below the drum axis and axially at each side of the partition ring and air outlets thereon above the drum axis and axially at each side of said ring; a bifurcated air conduit having branches connected respectively to said outlets; air-flow-generating means for causing air flow through the inlets, into the aforesaid air chamber and in heat-exchange relation to the drum fins as the drum rotates and out through said outlets and conduit; means at one end of the drum for introducing material to the interior of the drum; means for causing such material to move to the other end of the drum and in heat-exchange relation to the cylindrical wall as the drum rotates; and means at the other end of the drum for discharging the material.

8. Apparatus of the class described, comprising: an axially elongated rotatable material-handling drum having an imperforate cylindrical wall and opposite ends; an external partition ring encircling the drum intermediate its ends; a plurality of circumferentially spaced externally radial heat-exchange fins running lengthwise of the drum from said ring to said ends; a housing of generally U shape embracing the drum and having a semicylindrical wall generally concentric with the drum and opposite side walls joined to said semicylindrical wall, said housing further having opposite end walls respectively adjacent to the drum ends and said semicylindrical wall having a close running clearance with said ring and said housing affording an air chamber about said drum and substantially sealed off from the interior of said drum, said housing having air inlets therein axially at each side of said ring and further having air outlets also axially at each side of said ring; means for causing air to flow through the inlets, into said chamber and in heat-exchange relation to said fins and out through said outlets in two streams divided by said ring; means for introducing material into one end of said drum; and means for causing such material to move to the other end of the drum in heat-exchange relation to the cylindrical wall of the drum as the drum rotates.

References Cited in the file of this patent

UNITED STATES PATENTS

| | | |
|---|---|---|
| 522,422 | Kittson et al. | July 3, 1894 |
| 1,679,973 | Jacobs | Aug. 7, 1928 |